United States Patent
Arquevaux et al.

(10) Patent No.: US 6,477,808 B1
(45) Date of Patent: Nov. 12, 2002

(54) VEHICLE DOOR MODULE WITH INTEGRATED SUPPORTING PANEL

(75) Inventors: Laurent Arquevaux, Sully-sur-Loire; Phillipe Delire, Beaumont S/S, both of (FR)

(73) Assignee: Meritor Light Vehicle Systems-France (FR)

(*) Notice: Subject to any disclaimer, the term of this patent is extended or adjusted under 35 U.S.C. 154(b) by 0 days.

(21) Appl. No.: 09/707,298

(22) Filed: Nov. 6, 2000

(51) Int. Cl.[7] ............................................. E05F 11/48
(52) U.S. Cl. ........................................... 49/352; 49/349
(58) Field of Search ........................... 49/348, 349, 352, 49/502; 296/146.5

(56) References Cited

U.S. PATENT DOCUMENTS

| | | | | |
|---|---|---|---|---|
| 4,314,692 A | * | 2/1982 | Bauer et al. | 49/352 |
| 4,471,251 A | * | 9/1984 | Yamashita | 49/349 |
| 4,657,523 A | * | 4/1987 | Chevance et al. | 49/352 |
| 4,785,585 A | * | 11/1988 | Grier et al. | 49/349 |
| 5,430,977 A | * | 7/1995 | Kitayama et al. | 49/352 |
| 5,548,930 A | * | 8/1996 | Morando | 49/502 |
| 5,890,321 A | * | 4/1999 | Staser et al. | 49/352 |
| 5,907,897 A | * | 6/1999 | Hisano | 49/502 |
| 6,233,875 B1 | * | 5/2001 | Carlo et al. | 49/502 |

FOREIGN PATENT DOCUMENTS

| | | |
|---|---|---|
| DE | 196 54 956 A | 3/1998 |
| EP | 0 796 753 A | 9/1997 |
| GB | 2 315 513 A | 5/1998 |
| WO | WO 94 03341 A | 2/1994 |

* cited by examiner

Primary Examiner—Jerry Redman
(74) Attorney, Agent, or Firm—Carlson Gaskey & Olds

(57) ABSTRACT

A vehicle door module, comprising a panel fitted with various items of equipment including a window lifter of the type having two rails for guiding runners supporting the window and having cables for driving the runners, the window lifter likewise possessing a drum which is disposed in a cover and on which the cables are wound. An element for fixing the cover to the panel, and for controlling the rotation of the drum are disposed on a side of the panel opposite the side on which the rails, the cables, the cover and the drum are positioned; the cover of the of the drum is molded integrally with the panel and controlling the drum are fixed in a leaktight manner to the panel and to the cover. The integration of the cover into the supporting panel reduces the number of pieces in the module and makes it possible to obtain greater integration, while ensuring the necessary seal between the two faces of the panel at the location of the fixing elements for driving the drum in rotation.

7 Claims, 2 Drawing Sheets

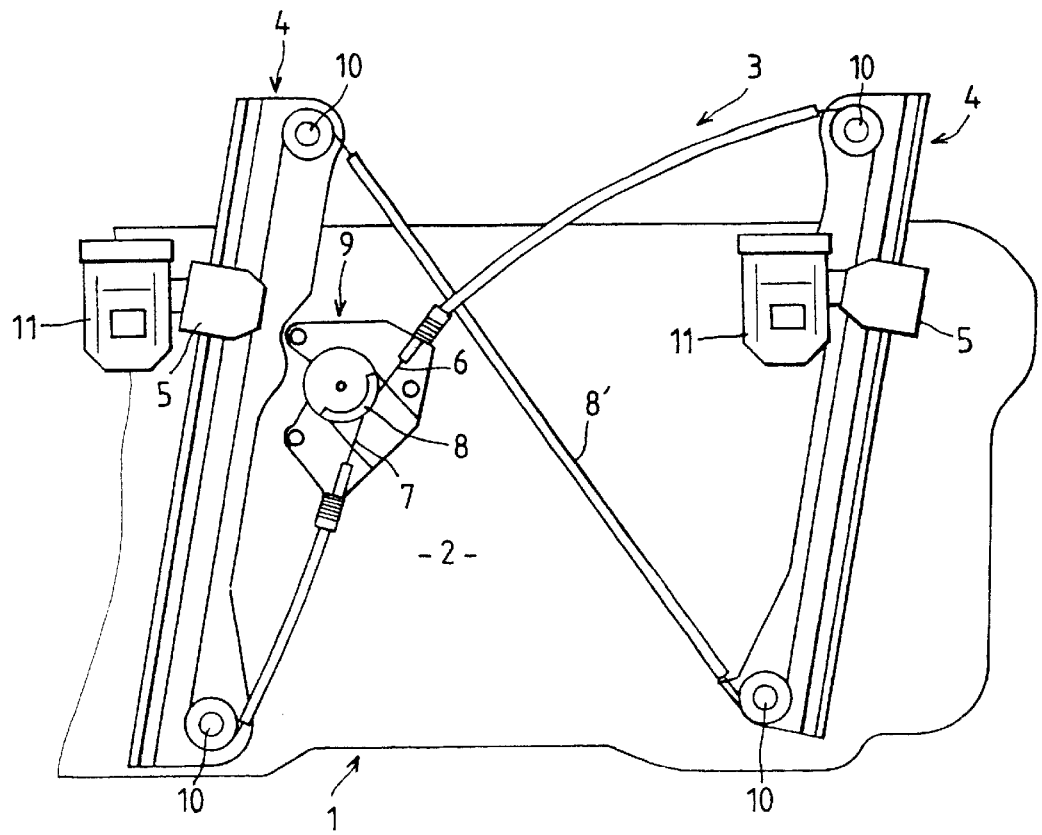
FIG.1
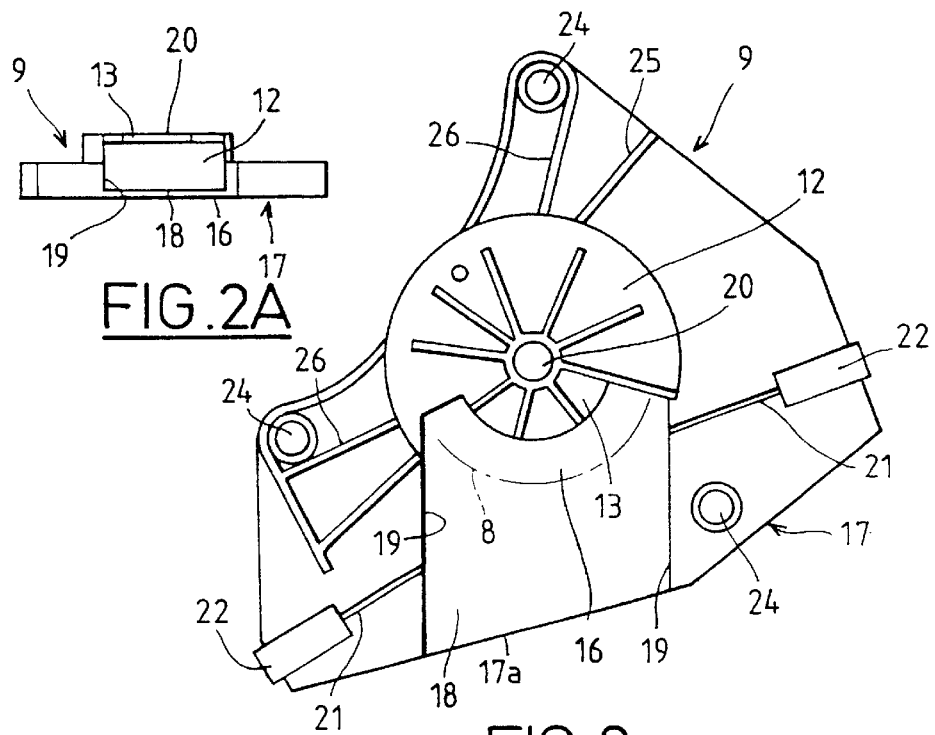
FIG.2A
FIG.2

VEHICLE DOOR MODULE WITH INTEGRATED SUPPORTING PANEL

BACKGROUND OF THE INVENTION

The present invention relates to a motor vehicle door module, of the type comprising a panel fitted with various items of equipment including a window lifter having two rails for guiding runners supporting the window and having cables for driving the runners.

A window lifter of this type likewise comprises a drum which is disposed in a cover and on which the cables are wound, a means for fixing the cover to the panel, and a means for controlling the rotation of the drum disposed on a side of the panel opposite the side on which the rails, the cables, the cover and the drum are positioned.

Thus, the cover accommodating the drum must be attached in a leaktight manner to the supporting panel by appropriate means while being solidly fixed to the drive means of the window lifter situated on the opposite side to the supporting panel, that is to say on the "dry" side, the cover, the rails and the cables being situated on the outer, "wet" side.

This structure and the corresponding manner of assembly of the window lifter on the panel require separate moulding of the cover of the drum and of the supporting panel, and specific manipulations to mount the cover on the panel and fix it thereon, together with particular attention to maintaining leaktightness at the location of the fixing joints. Furthermore, having regard to the need to maintain the cover/drum assembly, it is necessary to add a clamp thereto temporarily to retain the drum in the assembly during the mounting process.

SUMMARY OF THE INVENTION

The object of the invention is to produce a door module designed in a manner such as to reduce the total number of pieces necessary, further to integrate the existing pieces, and to reduce assembly operations by eliminating the clamp and changing the method of assembly.

According to the invention, the cover of the drum is produced integrally with the panel and possesses means for retaining the drum in the said cover that can be used during assembly.

A module is thus produced having a smaller total number of pieces, since the cover forms an integral part of the panel, which may be made either from plastic or from metal.

Another important advantage obtained by virtue of this integration of the cover of the drum with the panel is that it becomes possible to mount all the pieces of the window lifter on the same, outer side of the panel, with the exception of the members for driving the drum, in other words a handle for manual driving or a motor and its electronic control unit for an electrical window lifter.

In a manner known per se, use is made of a punching die and a matrix shaped so as to define between them intervals suitable for receiving the cast material in order to form a wall, a seating for the drum and grooves for the passage of the cables of the window lifter and grooves for retaining the "pipes" of the window lifter.

BRIEF DESCRIPTION OF THE DRAWINGS

Other features and advantages of the invention will become apparent in the course of the description which follows, given with reference to the appended drawings which illustrate an embodiment thereof by way of non-limiting example.

FIG. 1 is a simplified longitudinal elevation of an embodiment of the vehicle door module according to the invention.

FIG. 2 is a plan view, from the wet side and on a reduced scale, of the cover for the drum for driving the window lifter fitted to the module according to FIG. 1.

FIG. 2A is an elevation on a reduced scale by comparison with FIG. 2 of the cover of the drum.

DETAILED DESCRIPTION OF THE PREFERRED EMBODIMENT

Figure 3:
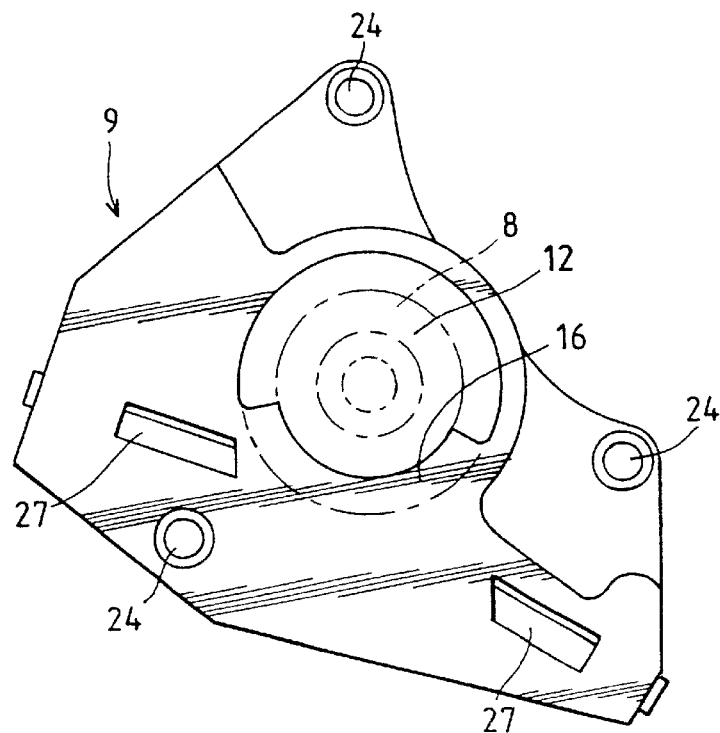
FIG. 3 is a plan view of the rear face (dry side) of the cover according to FIG. 2, turned towards the "dry" side of the door module according to FIG. 1.

The vehicle door module 1, shown in FIG. 1 comprises a panel 2 fitted with various equipment items including a window lifter 3 of the type having two rails 4 for guiding corresponding runner 5, supporting a window (not shown). The window lifter 3 likewise comprises three cable 6, 7, 8' for driving the runners 5, these cables 6, 7 being capable of being wound up into grooves of a drum 8 disposed in a cover 9 solidly fixed to the supporting panel 2.

Associated with the runners 5 are respective clamps 11, known per se, which receive the lower edge of the window within their jaws.

The drum 8 may be driven in rotation by control mean, disposed on the side of the panel 2 opposite the outer, "wet" side on which the rails 4, the cable, 6, 7, 8', the cover 9 and the drum 8 are positioned. The means for controlling the drum 8, positioned on the "dry" side of the panel 2, are formed either by a manual drive handle in the case of a manual window lifter or by a gear motor system that mayor may not be equipped with an electronic control unit, the elements being known per se and not shown.

The upper and lower ends of the rails 4 are equipped with return members 10 for the cables 6, 7, advantageously formed by pulleys in a manner known per se.

The cover 9 of the drum 8 is moulded or cast integrally with the panel 2, either in an appropriate plastic or a metal. In the second case, it is not moulded but forged or stamped.

The cover 9 possesses a seating 12 defined on one side by a wall forming a circular lid 13 suitable for at least partially covering the position reserved for the drum 8, leaving an angular sector free. On the opposite side, in other words on the "dry" side, the seating 12 is defined by a lateral pad 16 for retaining the drum 8, partially covering the position envisaged for the latter (FIG. 3) The pad 16 may be produced, for example, in the form of a circular sector extending over part of the periphery of the drum 8. The pad 16 extends over the angular sector corresponding to the free angular portion of the wall of the lid 13, whose circumference it completes opposite the free portion.

The cover 9 possesses a wall 17 extending around the lid 13 and the pad 16, with both of which it is integrally moulded. This wall 17 is shaped so as to define a U-shaped channel 18 extending from the edge 17a of the wall 17 to the seating 12 of the drum 8 and opening radially into the latter via the sector 16. On either side of the channel 18, whose width is substantially equal to the diameter of the drum 8, the wall 17 forms flanks 19 perpendicular to the bottom of the channel 18. Lateral grooves 21, designed for the passage of the drive cables 6, 7, 8' of the drum 8, open into these flanks 19. Each groove 21 is extended, on the side opposite the channel 18, by a widened portion 22 equipped with lateral fins (not visible in the drawing) for retaining the pipe of the corresponding cable.

The grooves 21, 22 are oriented at an angle so as to open into the U-shaped channel 18 and at the entry to the seating 12 approximately tangentially to the latter, which is substantially cylindrical. Finally, fixing locations for the drive means of the drum 8, for example three holes 24 designed to receive fixing members (not shown) such as screws, are moulded in the wall 17 of the cover 9. Ribs 25, 26 may be moulded onto the wall 17 to strengthen the latter.

The cover 9, which has just been described, is moulded integrally with the whole of the rest of the supporting panel 2 according to the invention.

During this moulding, one of the parts of the tooling used (known per se and not shown) comprises relief elements which pass through positions left free for the cast material forming the cover 9 and intended to permit the production of the grooves 21, 22 but also of the sectors 13 and 16. These relief portions leave gaps 27 in the cover 9 after their withdrawal (FIG. 3).

Figure 4:
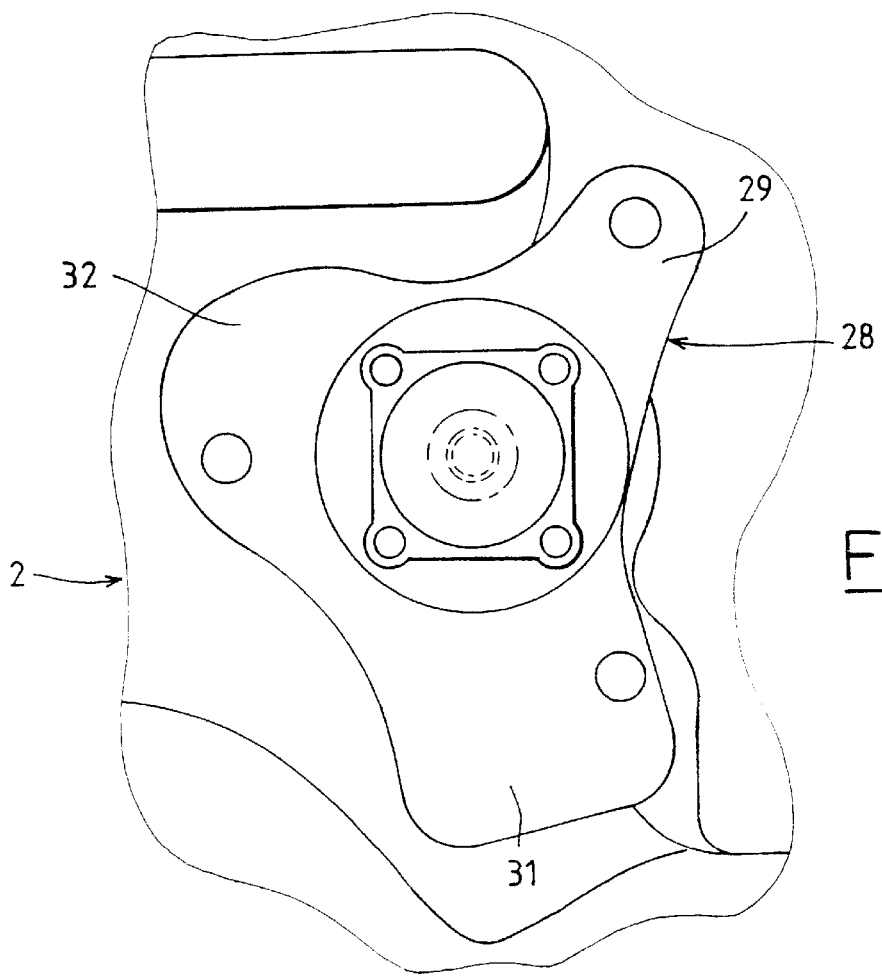
FIG. 4 is an elevation of an example of a fixing housing for the equipment for driving the drum of the window lifter, positioned on the "dry" side of the door module according to FIG. 1.

On the "dry" side of the panel 2, the fixing of the means for driving the drum 8 in rotation to the panel 2 and coaxially to the drum 8 is provided by a housing 28 (FIG. 4) equipped with lugs 29, 31, 32 extending radially above the gaps 27 and the lid 13 in order to ensure the leaktightness of the fixing of the housing 28 on the panel 2.

The arrangement comprising the lid 13 and the pad 16 of the drum 8 renders superfluous the drum retention clamp used hitherto.

The tangential engagement of the drum 8 by the cables 6, 7 in grooves tangential to the drum enables the interaction of the cables and the drum to be optimized.

What is claimed is:

1. A vehicle door module comprising, a panel fitted with various items of equipment including a window lifter of a type having two rails for guiding runners supporting a window and having cables for driving the runners, the window lifter likewise possessing a drum which is disposed in a cover and on which the cables are wound, means for fixing the cover to the panel, and means for controlling the rotation of the drum disposed on a side of the panel opposite the side on which the rails, the cables, tile cover and the drum are positioned, wherein the cover of the drum is produced integrally with the panel and possesses means for retaining the drum in the cover, said cover including a seating for the drum and a wall shaped so as to define a U-shaped channel extending from an edge of the wall to the seating of the drum and opening radially into the latter, and on either side of this channel the wall defines lateral grooves for passage of the cables for driving the drum.

2. The vehicle door module according to claim 1, wherein the panel and the cover of the drum are molded integrally in plastic.

3. The vehicle door module according to claim 1, wherein the panel and the cover of the drum are cast integrally in metal.

4. The vehicle door module according to claim 1, wherein said seating for the drum is defined on one side by a circular lid, said lid at least partially covering the position reserved for the drum and, on the opposite side, by a lateral pad for retaining the drum, partially covering the position thereof and extending over an angular sector corresponding to a free portion of the lid and facing the latter.

5. The door module according to claim 1, wherein the grooves for passage of the cables are provided with lateral fins for retaining the cables.

6. The door module according to claim 1, wherein the grooves for passage of the cables are oriented so as to open into the U-shaped channel and at an entry to the seating to the drum approximately tangentially to the drum.

7. The door module according to 1, wherein the drum interacts with rotational control means fixed in a leaktight manner to said panel.

* * * * *

UNITED STATES PATENT AND TRADEMARK OFFICE
CERTIFICATE OF CORRECTION

PATENT NO.   : 6,477,808 B1  
DATED        : November 12, 2002  
INVENTOR(S)  : Arquevaux et al.

It is certified that error appears in the above-identified patent and that said Letters Patent is hereby corrected as shown below:

Column 4,
Line 7, delete "tile" and insert -- the --.

Signed and Sealed this

Eighteenth Day of March, 2003

JAMES E. ROGAN
*Director of the United States Patent and Trademark Office*